US012741620B2

(12) United States Patent
Blattert et al.

(10) Patent No.: US 12,741,620 B2
(45) Date of Patent: Sep. 22, 2026

(54) METHOD FOR RE-TENSIONING AN ELECTROMECHANICAL PARKING BRAKE DEVICE OF A VEHICLE

(71) Applicant: Robert Bosch GmbH, Stuttgart (DE)

(72) Inventors: Dieter Blattert, Kirchheim/Neckar (DE); Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/172,813

(22) Filed: Apr. 8, 2025

(65) Prior Publication Data

US 2025/0376136 A1 Dec. 11, 2025

(30) Foreign Application Priority Data

Jun. 10, 2024 (DE) ..................... 10 2024 205 350.3

(51) Int. Cl.
*B60T 8/172* (2006.01)
*B60T 7/12* (2006.01)
(Continued)

(52) U.S. Cl.
CPC ................ *B60T 8/172* (2013.01); *B60T 7/12* (2013.01); *B60T 8/171* (2013.01); *B60T 17/22* (2013.01);
(Continued)

(58) Field of Classification Search
CPC . B60T 8/172; B60T 7/12; B60T 8/171; B60T 17/22; B60T 1/065; B60T 13/746;
(Continued)

(56) References Cited

U.S. PATENT DOCUMENTS 6,039,410 A * 3/2000 Robertson ................. B60T 7/20 188/3 R
8,930,110 B2 * 1/2015 Baehrle-Miller ..... B60T 13/588 701/70
(Continued)

FOREIGN PATENT DOCUMENTS

| | | | |
|---|---|---|---|
| DE | 10304834 | A1 | 8/2004 |
| DE | 102010000737 | A1 | 8/2010 |
| EP | 2746122 | A1 | 6/2014 |

*Primary Examiner* — Ramsey Refai
(74) *Attorney, Agent, or Firm* — Norton Rose Fulbright US LLP

(57) ABSTRACT

A method for re-tensioning an electromechanical parking brake device of a vehicle. The electromechanical parking brake device includes first and second electromechanical braked. The method includes: ascertaining whether re-tensioning of the first electromechanical brake is necessary, performing a diagnosis to check a re-tensioning functionality of the parking brake device, if re-tensioning is necessary, and re-tensioning the first electromechanical brake only if no fault is recognized. The re-tensioning includes: controlling a locking device of the first electromechanical brake to release the locking, pressing at least one brake pad of the first electromechanical brake against a brake disk of the first electromechanical brake with a specified force using an electromechanical actuator of the first electromechanical brake, controlling the locking device of the first electromechanical brake to lock the at least one brake pad of the first electromechanical brake when pressed against the brake disk of the first electromechanical brake.

10 Claims, 4 Drawing Sheets

(51) Int. Cl.

| | |
|---|---|
| ***B60T 8/171*** | (2006.01) |
| ***B60T 17/22*** | (2006.01) |
| ***F16D 65/18*** | (2006.01) |
| *B60T 1/06* | (2006.01) |
| *B60T 13/74* | (2006.01) |
| *F16D 127/06* | (2012.01) |

(52) U.S. Cl.
CPC .............. *F16D 65/18* (2013.01); *B60T 1/065* (2013.01); *B60T 13/746* (2013.01); *B60T 2270/406* (2013.01); *F16D 2127/06* (2013.01)

(58) Field of Classification Search
CPC . B60T 2270/406; F16D 65/18; F16D 2127/06
See application file for complete search history.

(56) References Cited

U.S. PATENT DOCUMENTS

| | | | | |
|---|---|---|---|---|
| 11,292,445 B2 * | 4/2022 | Bensch | B60T 7/12 | |
| 2006/0163939 A1 * | 7/2006 | Kuramochi | B60T 8/885 | 303/122.04 |
| 2007/0179020 A1 * | 8/2007 | Sokoll | B60T 7/12 | 477/182 |
| 2009/0314590 A1 * | 12/2009 | Dagh | B60T 7/12 | 188/110 |
| 2014/0214296 A1 * | 7/2014 | Baehrle-Miller | B60T 13/746 | 701/70 |
| 2014/0222307 A1 * | 8/2014 | Richter | B60T 7/12 | 701/70 |
| 2017/0305403 A1 * | 10/2017 | Maron | B60T 8/171 | |
| 2021/0155216 A1 * | 5/2021 | Bensch | B60T 13/66 | |

* cited by examiner

METHOD FOR RE-TENSIONING AN ELECTROMECHANICAL PARKING BRAKE DEVICE OF A VEHICLE

CROSS REFERENCE

The present application claims the benefit under 35 U.S.C. § 119 of German Patent Application No. DE 10 2024 205 350.3 filed on Jun. 10, 2024, which is expressly incorporated herein by reference in its entirety.

FIELD

The present invention relates to a method for re-tensioning an electromechanical parking brake device of a vehicle.

BACKGROUND INFORMATION

Electromechanical brakes (EMB) generally have very high efficiency and, due to their design principle, are non-self-locking, up to a certain extent. The focus is on the most efficient possible conversion of electrical energy for operating the EMB into braking energy and the lowest possible internal friction, so that, in the event of a fault, when active or electrical control of the EMB is not possible, the service brake can be applied by the energy stored in the brake clamp.

However, due to the very low self-locking effect, electromechanical brakes must be provided with an engageable locking mechanism, such as a pawl, in order to implement a parking brake. After the locking mechanism has been engaged, the brake can be transferred to a currentless state, since the applied clamping force is sufficient for parking.

However, this clamping force generally decreases, in particular if the brake disk and the pads have a temperature of several 100° C. at the time of parking. During the subsequent cooling process to ambient temperature, the clamping force decreases proportionally to the change in length and the system stiffness.

In order to be able to park the vehicle safely, the parking brake can, for example, be tensioned with a higher clamping force in order to ensure that a defined clamping force is present even after the cooling process. However, the disadvantage here is the higher mechanical load on the brake components, which, in the hot state, can result in the brake pads sticking to the hot brake disk.

Alternatively, the parking brake can be re-tensioned after a specified period of time after the vehicle has been parked, in order to compensate for the reduced clamping force. In contrast to the strategy based on a force increase, this strategy is more gentle on the components, since force increases can be avoided. However, in the case of electromechanical brakes, it must be ensured that the parking brake can be re-locked after re-tensioning, since, otherwise, there is a risk of further clamping force loss.

SUMMARY

An aim of the present invention is to provide a method for re-tensioning an electromechanical parking brake device, with which clamping force losses during re-tensioning of the parking brake device can be minimized.

According to a first aspect of the present invention, a method for re-tensioning an electromechanical parking brake device of a vehicle is provided. the electromechanical parking brake device comprises a first and a second electromechanical brake, each comprising: a brake disk, at least one brake pad, an electromechanical actuator configured to press the at least one brake pad against the brake disk to generate a braking effect, and a locking device configured to lock the at least one brake pad when pressed against the brake disk. According to an example embodiment of the present invention, the method comprises:

- ascertaining whether re-tensioning of the first electromechanical brake is necessary,
- performing a diagnosis to check a re-tensioning functionality of the parking brake device, if re-tensioning is necessary, and
- re-tensioning the first electromechanical brake only if no fault is recognized during the diagnosis, wherein the re-tensioning comprises:
  - controlling the locking device of the first electromechanical brake to release the locking,
  - pressing the at least one brake pad of the first electromechanical brake against the brake disk of the first electromechanical brake with a specified force by means of the electromechanical actuator of the first electromechanical brake,
  - controlling the locking device of the first electromechanical brake to lock the at least one brake pad of the first electromechanical brake when pressed against the brake disk of the first electromechanical brake.

The risk of a clamping force loss can be minimized in that, according to the method of the present invention, a diagnosis to check a re-tensioning functionality of the parking brake device is performed before re-tensioning, and re-tensioning of the first electromechanical brake is performed only if no fault is recognized during the diagnosis.

According to an example embodiment of the present invention, as part of the diagnosis, it can be checked, for example, whether the parking brake device can be supplied with sufficient electrical power for re-tensioning, whether there is an electrical short circuit or whether the parking brake device is free of mechanical faults. Furthermore, it can be provided that the course of the electrical power supplied to the actuator or the behavior of the actuator itself is monitored for the purpose of diagnosing the parking brake device.

The need for re-tensioning can be ascertained, for example, on the basis of a brake temperature. For example, it can be assumed that, from a specified brake temperature, e.g., 200° C., a clamping force loss is to be expected due to thermal contraction after the vehicle has been parked.

According to an example embodiment of the present invention, before or during re-tensioning of the first electromechanical brake, a residual clamping force between the at least one brake pad of the first electromechanical brake and the brake disk of the first electromechanical brake can be ascertained. The residual clamping force can be ascertained, for example, on the basis of an electrical power supplied to the electromechanical actuator. The electromechanical actuator of the first and/or second electromechanical brake can, for example, comprise an electric motor. With an electromechanical actuator designed in this way, the electrical power supplied to the electric motor can be increased until a shaft of the electric motor begins to rotate. The electrical power supplied can be used as a measure of the residual clamping force.

After re-tensioning the first electromechanical brake, it can be checked whether the locking of the at least one brake pad of the first electromechanical brake was successful or not. This check can be performed, for example, by means of the electromechanical actuator. In this case, the electromechanical actuator can be driven to release the at least one brake pad from the brake disk, i.e., in the direction of release. If the supplied electrical power exceeds a specified threshold value, it can be assumed that the locking was successful.

According to an example embodiment of the present invention, if the locking of the at least one brake pad of the first electromechanical brake was successful, the second electromechanical brake can subsequently be re-tensioned, wherein the re-tensioning of the second electromechanical brake can be performed analogously to the re-tensioning of the first electromechanical brake, i.e., the re-tensioning can comprise:

- controlling the locking device of the second electromechanical brake to release the locking of the second electromechanical brake,
- pressing the at least one brake pad of the second electromechanical brake against the brake disk of the second electromechanical brake with a specified force by means of the electromechanical actuator of the second electromechanical brake,
- controlling the locking device of the second electromechanical brake to lock the at least one brake pad of the second electromechanical brake when pressed against the brake disk of the second electromechanical brake.

If, however, the locking of the at least one brake pad of the first electromechanical brake was not successful, it can be provided that an electrical power supplied to the electromechanical actuator of the first electromechanical brake is reduced first, wherein the reduction of the electrical power is performed at such a reduction rate that, due to hysteresis, at least a specified residual clamping force remains between the at least one brake pad and the brake disk of the first electromechanical brake after the supply of electrical power to the electromechanical actuator of the first electromechanical brake has been switched off. As a result, it can be ensured that, despite the failed locking, a residual clamping force remains due to hysteresis, which is caused in particular by internal friction. The electrical power can be reduced over a period of between one second and several minutes. During such a period, the brake continues to cool down, which can result in an increase in internal friction and thus in higher residual clamping forces.

Since the first and second electromechanical brakes are generally designed similarly or identically and therefore have a similar hysteresis behavior, conclusions can be drawn about a residual clamping force of the second electromechanical brake from the previously ascertained residual clamping force of the first electromechanical brake, in order to be able to decide whether re-tensioning of the second electromechanical brake should be attempted after locking of the first electromechanical brake has failed.

According to an example embodiment of the present invention, it can be provided that the second electromechanical brake is re-tensioned if the ascertained residual clamping force between the at least one brake pad of the first electromechanical brake and the brake disk of the first electromechanical brake was smaller than a clamping force expected due to hysteresis, wherein the re-tensioning can comprise:

- controlling the locking device of the second electromechanical brake to release the locking of the second electromechanical brake,
- pressing the at least one brake pad of the second electromechanical brake against the brake disk of the second electromechanical brake with a specified force by means of the electromechanical actuator of the second electromechanical brake,
- controlling the locking device of the second electromechanical brake to lock the at least one brake pad of the second electromechanical brake when pressed against the brake disk of the second electromechanical brake.

If the residual clamping force in the first electromechanical brake is smaller than the clamping force expected due to hysteresis, it is assumed that the residual clamping force in the second electromechanical brake is also smaller than the clamping force expected due to hysteresis, so that the risk of a failed re-tensioning attempt for the second electromechanical brake can be accepted, since, due to hysteresis, the clamping force is higher than before, even if the re-tensioning attempt fails.

Here as well, it can be checked whether the locking of the at least one brake pad of the second electromechanical brake was successful or not.

According to an example embodiment of the present invention, if the locking of the at least one brake pad of the second electromechanical brake was not successful, an electrical power supplied to the electromechanical actuator of the second electromechanical brake can be reduced, wherein the reduction of the electrical power is performed at such a reduction rate that, due to hysteresis, at least a specified residual clamping force remains between the at least one brake pad and the brake disk of the second electromechanical brake after the supply of electrical power to the electromechanical actuator of the second electromechanical brake has been switched off. The electrical power can be reduced over a period of between one second and several minutes. During such a period, the brake continues to cool down, which can result in an increase in internal friction and thus in higher residual clamping forces.

If, however, it is determined that the ascertained residual clamping force between the at least one brake pad and the brake disk of the first electromechanical brake was not smaller than a clamping force expected due to hysteresis, it can be provided that the second electromechanical brake is not re-tensioned, since a failed re-tensioning attempt could result in a clamping force loss here.

In addition, further measures can be taken in order to compensate for or prevent a clamping force loss. For example, assuming that the above-described first and second electromechanical brakes are provided on a rear wheel of a vehicle, the residual clamping forces of the brakes on the front axle can also be increased to support standstill protection. For this purpose, the clamping forces on the front axle are activated significantly beyond the residual braking torque. Subsequently, the clamping force slowly decreases, so that an increased clamping force is achieved due to internal friction (hysteresis).

If this process is performed a few minutes after the vehicle has come to a standstill, it is possible not only to compensate for the clamping force loss (due to a thermal change in length), but also to exploit the facts that "cooled-down" electromechanical brakes have a slightly lower efficiency and that the residual clamping force is higher than in a warm brake.

The re-tensioning of the electromechanical brakes on the front axle can be performed before the re-tensioning on the rear axle, in order to provide the highest possible residual clamping force reserves in the system "vehicle."

Furthermore, for energy efficiency reasons, it can be provided that the re-tensioning of the electromechanical brakes on the front axle is carried out only if a fault has occurred during re-tensioning on the rear axle.

It is also possible to re-tension the electromechanical brakes on the front axle in particular if the vehicle is parked on a very steep slope (e.g., on a slope >20%). This can be carried out independently of estimated or measured temperatures on the braking system. In case the road friction coefficients are somewhat lower, the holding ability is further improved.

According to a second aspect of the present invention, a parking brake device is provided, comprising a first and a second electromechanical brake, each comprising: a brake disk, at least one brake pad, an electromechanical actuator configured to press the at least one brake pad against the brake disk to generate a braking effect, a locking device configured to lock the at least one brake pad when pressed against the brake disk, and a control device configured to perform a method described above.

The present invention is explained in more detail below with reference to the figures.

DETAILED DESCRIPTION OF EXAMPLE EMBODIMENTS

Figure 1:
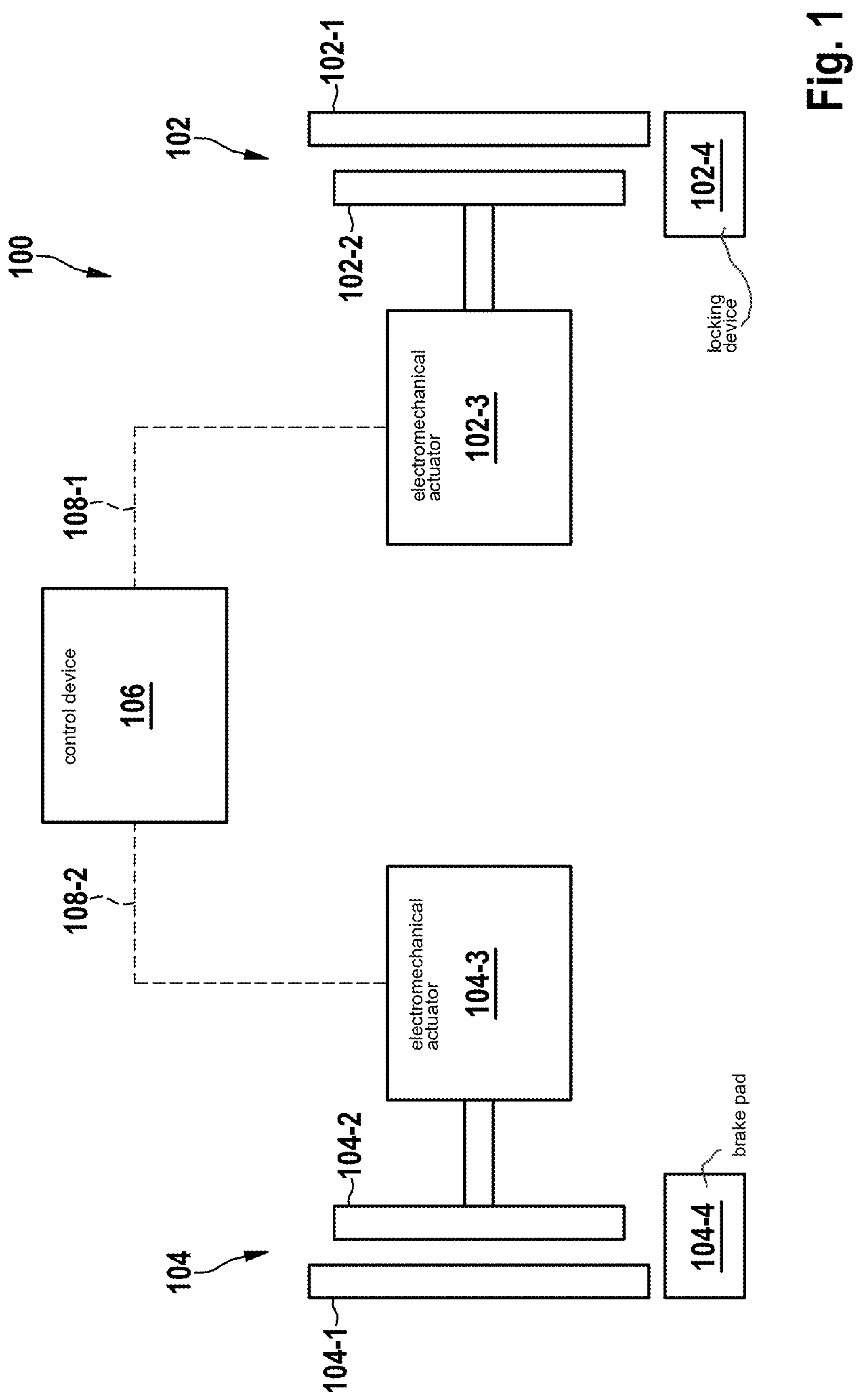
FIG. 1 is a schematic representation of an electromechanical parking brake device, according to an example embodiment of the present invention.

FIG. 1 is a schematic representation of an electromechanical parking brake device 100. The parking brake device 100 comprises: a first electromechanical brake 102, a second electromechanical brake 104, and a control device 106 configured to control the first electromechanical brake 104 and the second electromechanical brake 106. The control device 106 can be in data exchange connection with the first and second electromechanical brakes 102, 104 via assigned data lines 108-1, 108-2. The first and second electromechanical brakes 102, 104 can, for example, be provided on a common axle, e.g., a rear axle, of a vehicle.

The first electromechanical brake 102 comprises: a brake disk 102-1, a brake pad 102-2, an electromechanical actuator 102-3 configured to press the brake pad 102-2 against the brake disk 102-1 to generate a braking effect, and a locking device 102-4 configured to lock the brake pad 102-2 when pressed against the brake disk 102-1. The electromechanical actuator 102-3 can, for example, comprise an electric motor and possibly a rotation/translation gear configured to convert a rotational movement of the electric motor into a translational movement of the brake pad 102-2. The locking device 102-4 can, for example, comprise a pawl or be designed as a pawl.

The second electromechanical brake 104 can be designed similarly or identically to the first electromechanical brake 102. The second electromechanical brake 104 comprises: a brake disk 104-1, a brake pad 104-2, an electromechanical actuator 104-3 configured to press the brake pad 104-2 against the brake disk 104-1 to generate a braking effect and a locking device 104-4 configured to lock the brake pad 104-2 when pressed against the brake disk 104-1. The electromechanical actuator 104-3 can, for example, comprise an electric motor and possibly a rotation/translation gear configured to convert a rotational movement of the electric motor into a translational movement of the brake pad 104-2. The locking device 104-4 can, for example, comprise a pawl or be designed as a pawl.

Figure 2:
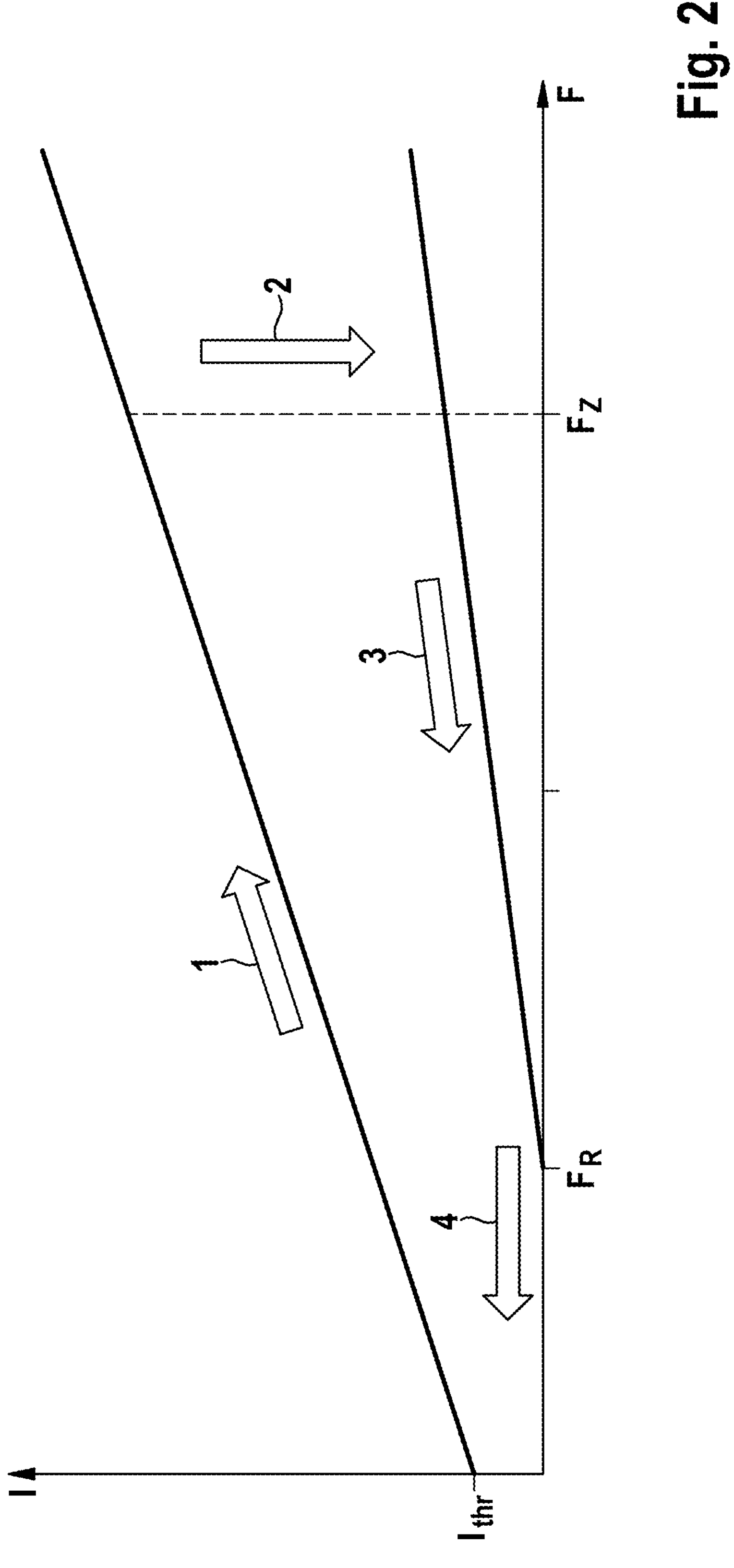
FIG. 2 is a graphical representation illustrating a relationship between the control current and the clamping force of an electromechanical brake, according to an example embodiment of the present invention.

FIG. 2 is a graphical representation illustrating a relationship between the control current and the clamping force of the first and second electromechanical brakes 102, 104. Purely by way of example, the description of FIG. 2 and FIG. 3 only refers to the first electromechanical brake 102. However, these statements also apply analogously to the second electromechanical brake 104.

In FIG. 2, the electrical current I supplied to the electromechanical actuator 102-3 is plotted over the clamping force F between the brake disk 102-1 and the brake pad 102-2.

As shown in FIG. 2, the current I must first be increased to a threshold value $I_{thr}$ in order to overcome the internal friction in the actuator 102-3.

A current increase beyond the threshold value $I_{thr}$ results in a force increase in the actuator 102-3, as indicated by the arrow marked with reference sign 1, up to a target clamping force $F_z$.

If the current I is reduced after the target clamping force $F_z$ has been reached, the target clamping force $F_z$ is initially retained, as indicated by the arrow marked with reference sign 2.

If the current I is further reduced, as indicated by the arrow marked with reference sign 3, the clamping force F is reduced to a residual clamping force $F_R$, which depends, inter alia, on the rate at which the current is reduced. If the current I is reduced over a period of about one second to several minutes, a significant residual clamping force $F_R$ can be maintained, which may be sufficient to brake the vehicle. If, however, no residual clamping force is desired, for example when travel is imminent, the current I can be quickly reduced or an electrical control can cause targeted acceleration in the direction of release, which results in coasting, as indicated by arrow 4, in the currentless state.

Figure 3:
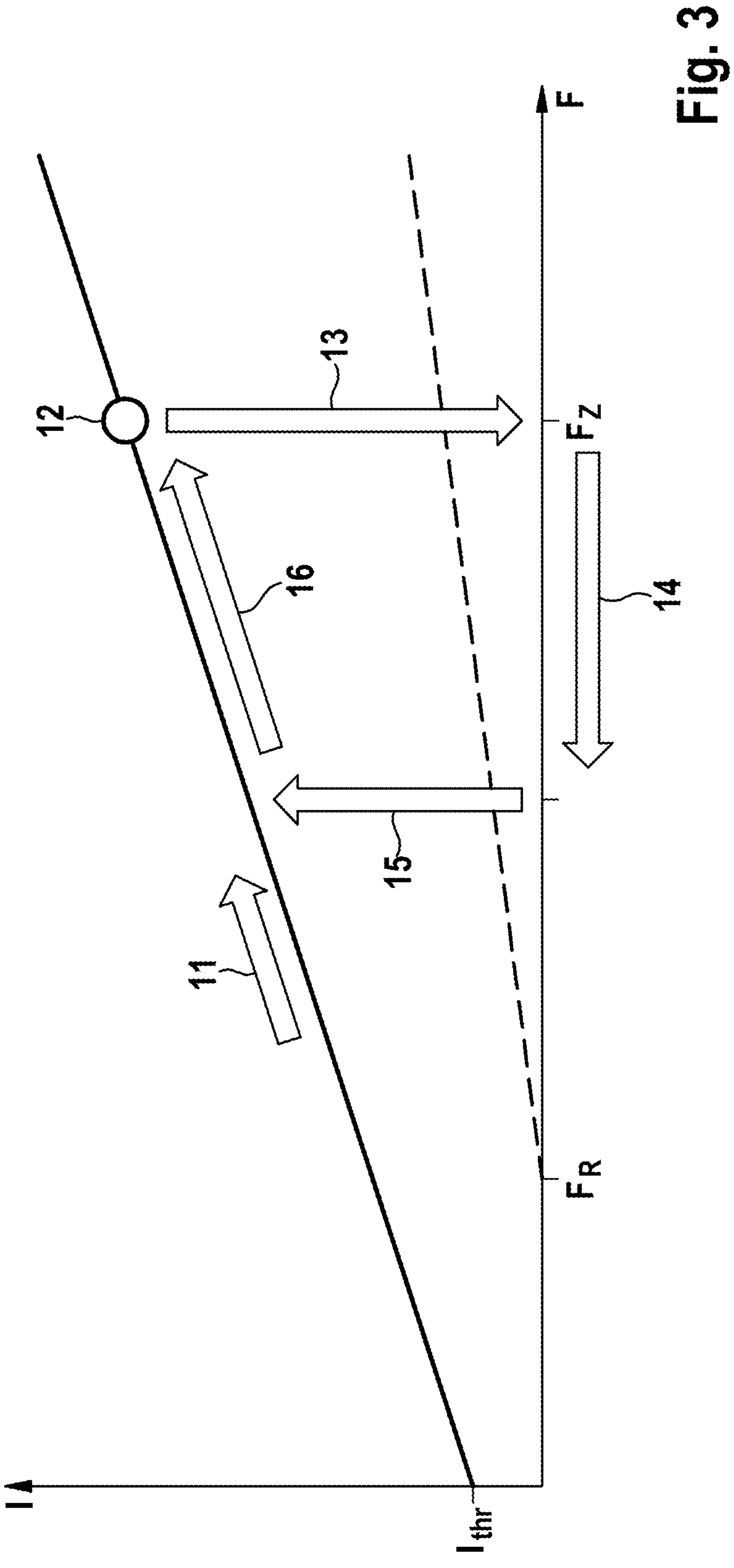
FIG. 3 is a graphical representation of an electromechanical brake control with parking and re-tensioning, according to an example embodiment of the present invention.

FIG. 3 shows an exemplary control of the first and second electromechanical brakes 102, 104 with parking and re-tensioning. For the sake of simplicity, reference is also made here only to the first brake 102.

As shown in FIG. 2, the current I must first be increased to a threshold value $I_{thr}$ to overcome the internal friction in the actuator 102-3.

A current increase beyond the threshold value $I_{thr}$ results in a force increase in the actuator 102-3, as indicated by the arrow marked with reference sign 11, up to a target clamping force $F_z$.

If the target clamping force $F_z$ has been reached, the brake pad 102-2 is locked by means of the locking device 102-4 (in the state indicated by reference sign 12). The target clamping force $F_z$ can be 10 kN, for example.

Due to the locking, no power supply to the actuator 102-3 is necessary in order to maintain the clamping force. The power supply can therefore be terminated, i.e., the current supplied to the actuator 102-3 is reduced, as indicated by arrow 13, e.g., to zero.

However, due to thermal relaxation, the clamping force decreases, as indicated by arrow 14. The higher the temperature of the brake disk 102-1 and of the brake pad 102-2 was when locking, the greater is the decrease in clamping force.

In order to counteract this decrease in clamping force, re-tensioning can be performed. During re-tensioning, the current I must be increased until the clamping force increases again (arrow 15). A further increase in current results in a corresponding force increase in the actuator (arrow 16). If the target clamping force $F_z$ is reached, locking takes place again.

However, re-tensioning carries the risk of a clamping force loss, in particular in the event of an electrical or mechanical fault. A re-tensioning strategy that minimizes the risk of a clamping force loss during re-tensioning is therefore needed.

Figure 4:
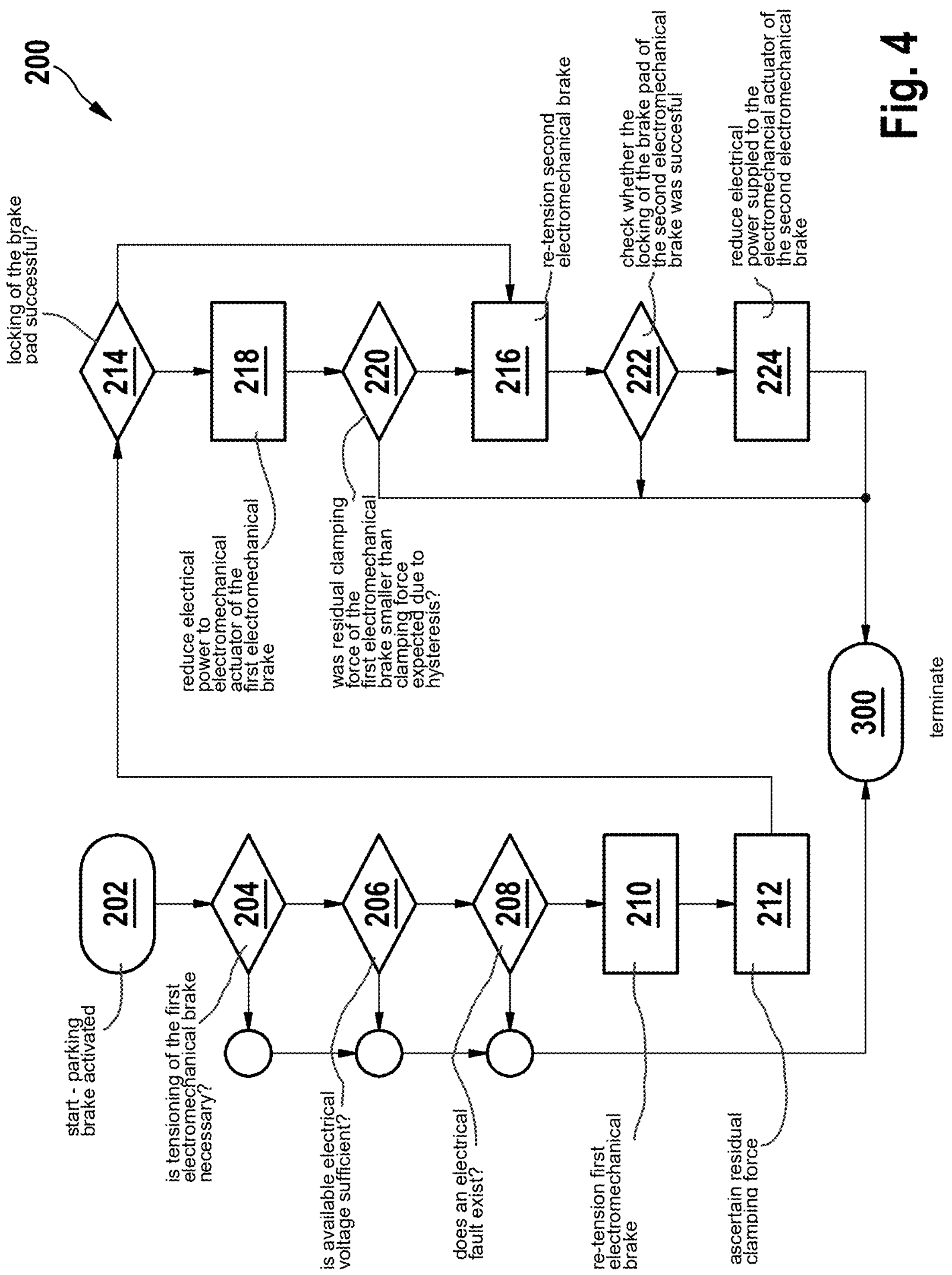
FIG. 4 is a flowchart of an exemplary method for re-tensioning an electromechanical parking brake device.

FIG. 4 shows a flowchart of an exemplary method 200 for re-tensioning the parking brake device 100 that can minimize the risk of a clamping force loss.

The method 200 starts after the vehicle has been parked and the parking brake device 100 has been activated (202).

Subsequently, in step 204, it is ascertained whether re-tensioning of the first electromechanical brake 102 is necessary. The need for re-tensioning can be ascertained, for example, on the basis of a brake temperature. For example, it can be assumed that, from a specified brake temperature, e.g., 200° C., a clamping force loss is to be expected due to thermal contraction after the vehicle has been parked.

If it is determined in step 204 that re-tensioning is not necessary, the method is terminated (transition to 300).

If, however, it is determined in step 204 that re-tensioning is necessary, a diagnosis to check a re-tensioning functionality of the parking brake device 100 is performed. As part of the diagnosis, it can first be checked whether an available electrical voltage is sufficient (step 206). If it is determined that the available electrical voltage is not sufficient, the method is terminated (transition to 300).

If, however, it is determined that the available electrical voltage is sufficient, a subsequent step 208 checks whether an electrical fault exists, for example whether the lines have a specified electrical resistance. If it is determined that an electrical fault exists, the method is terminated (transition to 300).

According to the method 200, re-tensioning is not performed if a fault is recognized during the diagnosis in steps 204 or 206. A fault recognized in these steps can, for example, have the result that re-locking cannot be performed after a successful clamping force build-up. Thus, by means of the diagnosis and by not re-tensioning the brake in the event of a fault identified during the diagnosis, a clamping force loss can thus be prevented in a simple and effective manner.

The two tests according to steps 204 and 206 are only by way of example. The diagnosis can of course be much more extensive. For example, it can also be checked whether a mechanical fault exists. If it is determined as part of the diagnosis that no fault exists, the first electromechanical brake 102 is re-tensioned (step 210), wherein the re-tensioning comprises:

- controlling the locking device 103-4 of the first electromechanical brake 102 to release the locking,
- pressing the brake pad 102-2 of the first electromechanical brake 102 against the brake disk 102-1 of the first electromechanical brake 102 with a specified force by means of the electromechanical actuator 102-3 of the first electromechanical brake 102, and
- controlling the locking device 102-4 of the first electromechanical brake 102 to lock the brake pad 102-2 of the first electromechanical brake 102 when pressed against the brake disk 102-1 of the first electromechanical brake 102.

Before or during re-tensioning of the first electromechanical brake 102, a residual clamping force between the at least one brake pad 102-2 of the first electromechanical brake 102 and the brake disk 102-1 of the first electromechanical brake 102 can be ascertained (step 212). The residual clamping force can be ascertained, for example, on the basis of an electrical power supplied to the electromechanical actuator 102-3. As stated above, the electromechanical actuator 102-3 can comprise, for example, an electric motor. With an electromechanical actuator designed in this way, the electrical power supplied to the electric motor can be increased for ascertaining the residual clamping force, until a shaft of the electric motor begins to rotate. The electrical power supplied can be used as a measure of the residual clamping force.

After re-tensioning the first electromechanical brake 102, it can be checked whether the locking of the at least one brake pad 102-2 of the first electromechanical brake 102 was successful or not (step 214). This check can be performed, for example, by means of the electromechanical actuator 102-3. In this case, the electromechanical actuator can be driven to release the at least one brake pad 102-2 from the brake disk 102-1, i.e., in the direction of release. If the supplied electrical power exceeds a specified threshold value, it can be assumed that the locking was successful.

If the locking of the brake pad 102-2 of the first electromechanical brake 102 was successful, the second electromechanical brake can subsequently be re-tensioned (step 216), wherein the re-tensioning of the second electromechanical brake 104 can be performed analogously to the re-tensioning of the first electromechanical brake 102, i.e., the re-tensioning can comprise:

- controlling the locking device 104-4 of the second electromechanical brake 104 to release the locking of the second electromechanical brake 104,
- pressing the brake pad 104-2 of the second electromechanical brake 104 against the brake disk 104-1 of the second electromechanical brake 104 with a specified force by means of the electromechanical actuator 104-3 of the second electromechanical brake 104,
- controlling the locking device 104-4 of the second electromechanical brake 104 to lock the at least one brake pad 104-2 of the second electromechanical brake 104 when pressed against the brake disk 104-2 of the second electromechanical brake 104.

If, however, the locking of the brake pad 102-2 of the first electromechanical brake 102 was not successful, it can be provided that an electrical power supplied to the electromechanical actuator 102-3 of the first electromechanical brake 102 is reduced first (step 218), wherein the reduction of the electrical power is performed at such a reduction rate that, due to hysteresis, at least a specified residual clamping force remains between the brake pad 102-2 and the brake disk 102-1 of the first electromechanical brake 102 after the supply of electrical power to the electromechanical actuator 102-3 of the first electromechanical brake 102 has been switched off. This hysteresis behavior was described above with reference to FIG. 2. As a result, it can be ensured that, despite the failed locking, a residual clamping force remains due to hysteresis, which is caused in particular by internal friction. The electrical power can be reduced over a period of between one second and several minutes. During such a period, the brake continues to cool down, which can result in an increase in internal friction and thus in higher residual clamping forces.

Since the first and second electromechanical brakes 102, 104 are designed similarly or identically and therefore have a similar hysteresis behavior, conclusions can be drawn about a residual clamping force of the second electromechanical brake 104 from the previously ascertained residual clamping force of the first electromechanical brake 102, in order to be able to decide whether re-tensioning of the second electromechanical brake 104 should be attempted after locking of the first electromechanical brake 102 has failed.

After step 218, it can therefore be checked whether the residual clamping force of the first electromechanical brake 102 was smaller than a clamping force expected due to hysteresis (step 220).

If it is determined that the ascertained residual clamping force between the brake pad 102-2 and the brake disk 102-1 of the first electromechanical brake 102 was not smaller than a clamping force expected due to hysteresis, it can be provided that the second electromechanical brake 104 is not re-tensioned, since a failed re-tensioning attempt could result in a clamping force loss here. In such a case, the method 200 can be terminated (transition to 300).

If, however, it is determined in step 220 that the ascertained residual clamping force between the brake pad 102-2 of the first electromechanical brake 102 and the brake disk 102-1 of the first electromechanical brake 102 was smaller than a clamping force expected due to hysteresis, the second electromechanical brake 104 can be re-tensioned, i.e., the method can proceed to the above-described step 216.

If the residual clamping force in the first electromechanical brake 102 was smaller than the clamping force expected due to hysteresis, it is assumed that the residual clamping force in the second electromechanical brake 104 is also smaller than the clamping force expected due to hysteresis, so that the risk of a failed re-tensioning attempt for the second electromechanical brake 104 can be accepted, since, due to hysteresis, the clamping force is higher than before, even if the re-tensioning attempt fails.

Here as well, it can subsequently be checked whether the locking of the brake pad 104-2 of the second electromechanical brake 104 was successful or not.

If the locking was successful, the method 200 can be terminated.

If, however, the locking of the brake pad 104-2 of the second electromechanical brake 104 was not successful, an electrical power supplied to the electromechanical actuator 104-3 of the second electromechanical brake 104 can be reduced (step 224), wherein the reduction of the electrical power is performed at such a reduction rate that, due to hysteresis, at least a specified residual clamping force remains between the brake pad 104-2 and the brake disk 104-1 of the second electromechanical brake 104 after the supply of electrical power to the electromechanical actuator 104-3 of the second electromechanical brake 104 has been switched off. The electrical power can be reduced over a period of between one second and several minutes. During such a period, the brake 104 continues to cool down, which can result in an increase in internal friction and thus in higher residual clamping forces.

In addition, further measures can be taken in order to compensate for or prevent a clamping force loss. For example, assuming that the above-described first and second electromechanical brakes 102, 104 are provided on a rear wheel of a vehicle, the residual clamping forces of the brakes on the front axle can also be increased to support standstill protection. For this purpose, the clamping forces on the front axle are activated significantly beyond the residual braking torque. Subsequently, the clamping force slowly decreases, so that an increased clamping force is achieved due to internal friction (hysteresis).

If this process is performed a few minutes after the vehicle has come to a standstill, it is possible not only to compensate for the clamping force loss (due to a thermal change in length), but also to exploit the facts that "cooled-down" electromechanical brakes have a slightly lower efficiency and that the residual clamping force is higher than in a warm brake.

The re-tensioning of the electromechanical brakes on the front axle can be performed before the re-tensioning on the rear axle, in order to provide the highest possible residual clamping force reserves in the system "vehicle."

Furthermore, for energy efficiency reasons, it can be provided that the re-tensioning of the electromechanical brakes on the front axle is carried out only if a fault has occurred during re-tensioning on the rear axle.

It is also possible to re-tension the electromechanical brakes on the front axle in particular if the vehicle is parked on a very steep slope (e.g., on a slope >20%). This can be carried out independently of estimated or measured temperatures on the braking system. In case the road friction coefficients are somewhat lower, the holding ability is further improved.

What is claimed is:

1. A method for re-tensioning an electromechanical parking brake device of a vehicle, wherein the electromechanical parking brake device includes a first electromechanical brake and a second electromechanical brake, each including: a brake disk, at least one brake pad, an electromechanical actuator configured to press the at least one brake pad against the brake disk to generate a braking effect, and a locking device configured to lock the at least one brake pad when pressed against the brake disk, wherein the method comprises the following steps:

- ascertaining whether re-tensioning of the first electromechanical brake is necessary;
- performing a diagnosis to check a re-tensioning functionality of the parking brake device, when re-tensioning is necessary; and
- re-tensioning the first electromechanical brake only when no fault is recognized during the diagnosis, wherein the re-tensioning includes:
  - controlling the locking device of the first electromechanical brake to release the locking,
  - pressing the at least one brake pad of the first electromechanical brake against the brake disk of the first electromechanical brake with a specified force using the electromechanical actuator of the first electromechanical brake, and
  - controlling the locking device of the first electromechanical brake to lock the at least one brake pad of the first electromechanical brake when pressed against the brake disk of the first electromechanical brake.

2. The method according to claim 1, wherein, before or during re-tensioning of the first electromechanical brake, a residual clamping force between the at least one brake pad of the first electromechanical brake and the brake disk of the first electromechanical brake is ascertained.

3. The method according to claim 1, further comprising checking whether the locking of the at least one brake pad of the first electromechanical brake was successful or not successful.

4. The method according to claim 3, further comprising re-tensioning the second electromechanical brake when the locking of the at least one brake pad of the first electromechanical brake was successful, wherein the re-tensioning of the second electromechanical brake includes:

- controlling the locking device of the second electromechanical brake to release the locking of the second electromechanical brake, pressing the at least one brake pad of the second electromechanical brake against the brake disk of the second electromechanical brake with a specified force using the electromechanical actuator of the second electromechanical brake, and controlling the locking device of the second electromechanical brake to lock the at least one brake pad of the second electromechanical brake when pressed against the brake disk of the second electromechanical brake.

5. The method according to claim 3, wherein, when the locking of the at least one brake pad of the first electromechanical brake was not successful, an electrical power supplied to the electromechanical actuator of the first electromechanical brake is reduced, wherein the reduction of the electrical power is performed at such a reduction rate that, due to hysteresis, at least a specified residual clamping force remains between the at least one brake pad and the brake disk of the first electromechanical brake after the supply of electrical power to the electromechanical actuator of the first electromechanical brake has been switched off.

6. The method according to claim 2, further comprising re-tensioning the second electromechanical brake when the ascertained residual clamping force between the at least one brake pad of the first electromechanical brake and the brake disk of the first electromechanical brake is smaller than a clamping force expected due to hysteresis, wherein the re-tensioning of the second electromechanical brake includes:

controlling the locking device of the second electromechanical brake to release the locking of the second electromechanical brake, pressing the at least one brake pad of the second electromechanical brake against the brake disk of the second electromechanical brake with a specified force using the electromechanical actuator of the second electromechanical brake, and controlling the locking device of the second electromechanical brake to lock the at least one brake pad of the second electromechanical brake when pressed against the brake disk of the second electromechanical brake.

7. The method according to claim 4, further comprising checking whether the locking of the at least one brake pad of the second electromechanical brake was successful or not.

8. The method according to claim 7, wherein, when the locking of the at least one brake pad of the second electromechanical brake was not successful, an electrical power supplied to the electromechanical actuator of the second electromechanical brake is reduced, wherein the reduction of the electrical power is performed at such a reduction rate that, due to hysteresis, at least a specified residual clamping force remains between the at least one brake pad and the brake disk of the second electromechanical brake after the supply of electrical power to the electromechanical actuator of the second electromechanical brake has been switched off.

9. The method according to claim 2, wherein, when the ascertained residual clamping force between the at least one brake pad and the brake disk of the first electromechanical brake is not smaller than a clamping force expected due to hysteresis, the second electromechanical brake is not re-tensioned.

10. A parking brake device, comprising:

a first electromechanical brake and a second electromechanical brake, each including:

a brake disk, at least one brake pad, an electromechanical actuator configured to press the at least one brake pad against the brake disk to generate a braking effect, and a locking device configured to lock the at least one brake pad when pressed against the brake disk; and a control device configured to re-tension an electromechanical parking brake device of a vehicle, by performing:

ascertaining whether re-tensioning of the first electromechanical brake is necessary;

performing a diagnosis to check a re-tensioning functionality of the parking brake device, when re-tensioning is necessary; and re-tensioning the first electromechanical brake only when no fault is recognized during the diagnosis, wherein the re-tensioning includes:

controlling the locking device of the first electromechanical brake to release the locking, pressing the at least one brake pad of the first electromechanical brake against the brake disk of the first electromechanical brake with a specified force using the electromechanical actuator of the first electromechanical brake, and controlling the locking device of the first electromechanical brake to lock the at least one brake pad of the first electromechanical brake when pressed against the brake disk of the first electromechanical brake.

* * * * *